INVENTOR.
Robert S. Webb
BY
Harry R. Dumont
ATTORNEY.

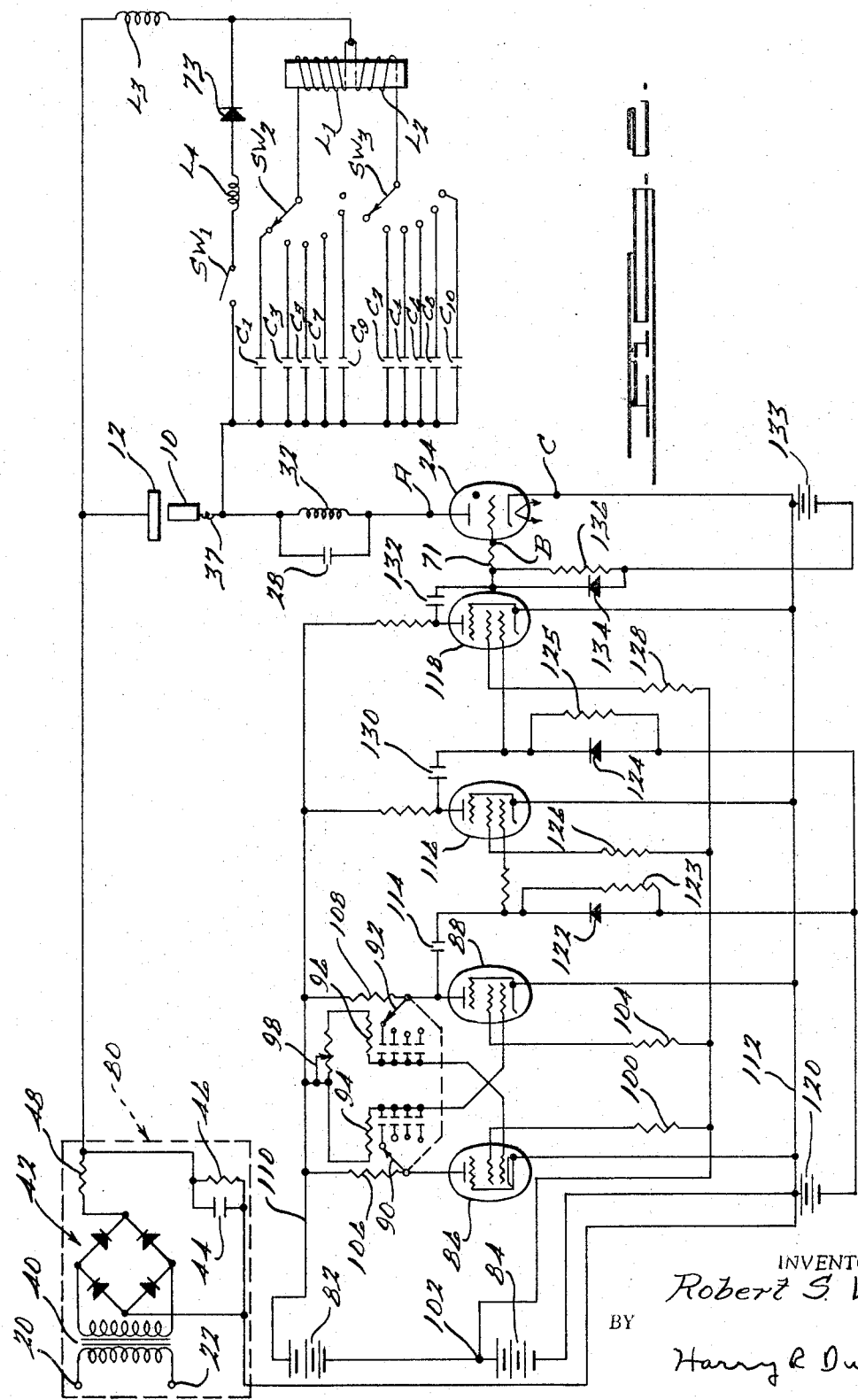

July 4, 1967
R. S. WEBB
3,329,866
ELECTRICAL DISCHARGE MACHINING POWER SUPPLY
APPARATUS AND METHOD
Filed Jan. 10, 1966
4 Sheets-Sheet 3
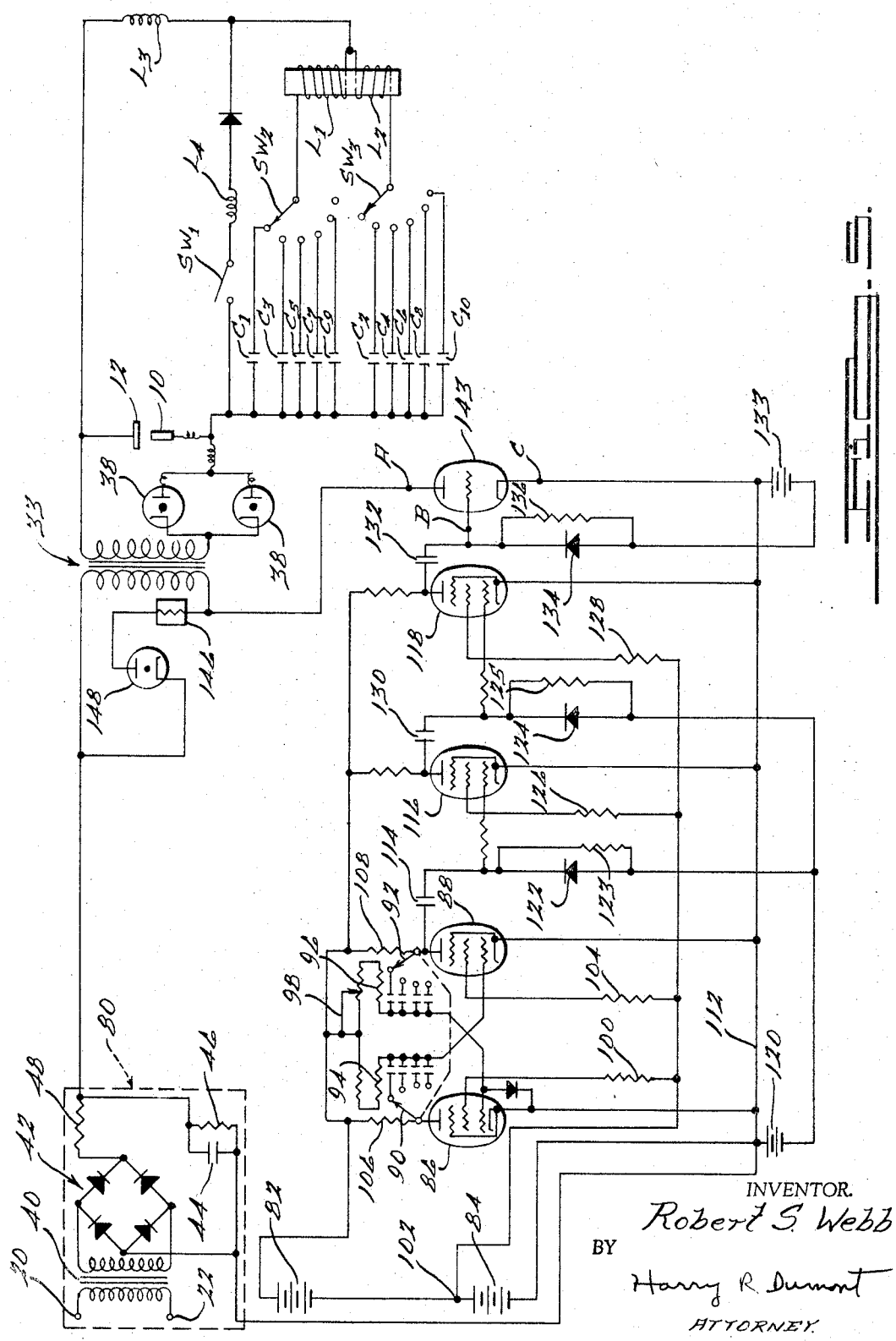
INVENTOR.
Robert S. Webb
BY
Harry R. Dumont
ATTORNEY.

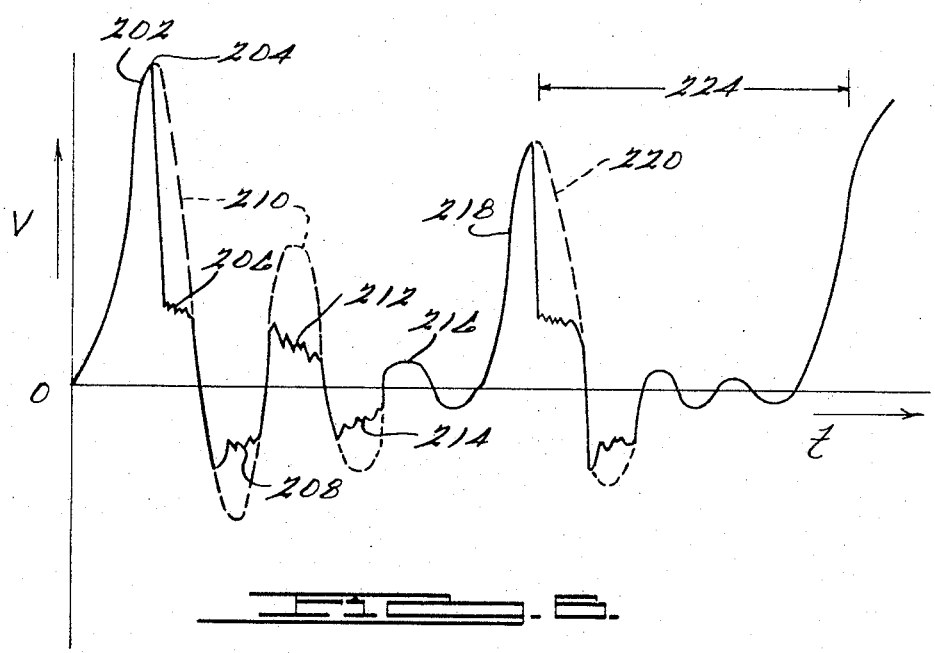
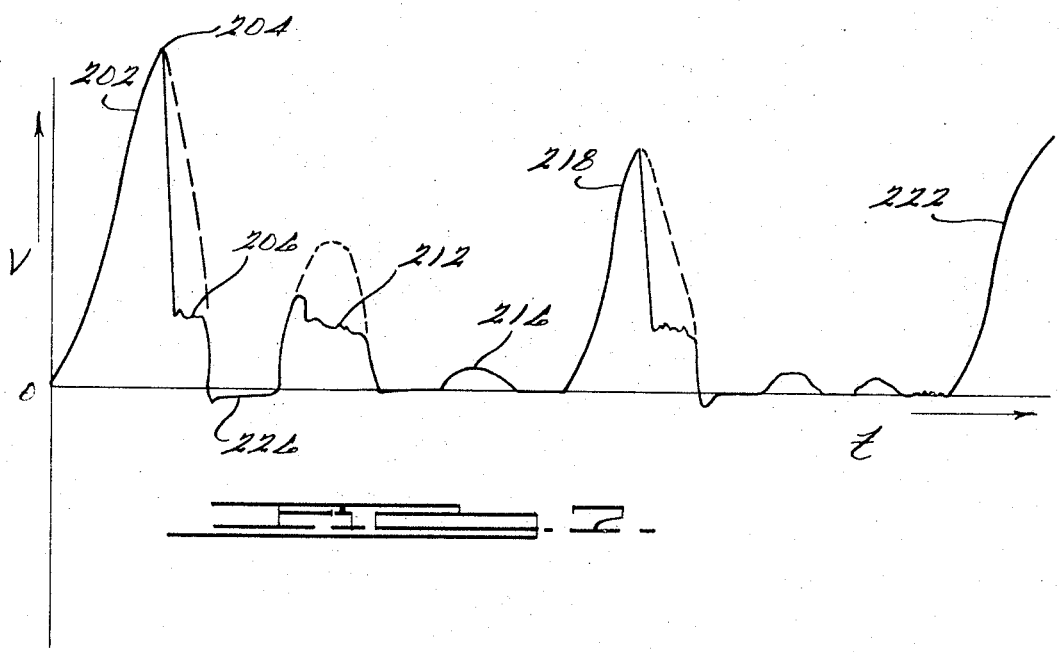

United States Patent Office 3,329,866
Patented July 4, 1967

3,329,866
ELECTRICAL DISCHARGE MACHINING POWER
SUPPLY APPARATUS AND METHOD
Robert S. Webb, Bloomfield Hills, Mich., assignor to Elox
Corporation, Troy, Mich., a corporation of Michigan
Filed Jan. 10, 1966, Ser. No. 519,556
3 Claims. (Cl. 315—124)

The present application is a continuation-in-part of my U.S. application No. 29,363, now Patent No. 3,229,159, entitled "Suerimposed High Striking Voltage," filed on May 16, 1960, and of common ownership herewith.

This invention relates generally to electrical discharge machining apparatus and, more particularly, to an improved machining power supply apparatus and method therefor.

In electrical discharge machining, electrical machining power pulses are passed between an electrode tool and a conductive workpiece through a dielectric fluid medium to provide stock removal at a precisely controlled rate and within close tolerance limits. The dielectric fluid utilized is a self-restoring, ionizable fluid such as kerosene, transformer oil, and the like. It has been found highly advantageous with certain combinations of electrode or work materials and gap polarity to utilize an electrical discharge machining power supply which furnishes high peak current pulses across the gap between electrode and workpiece. By the term "high peak current pulses," I mean pulses having a duty factor of not more than 10%. Electronic means for providing high peak current pulses i.e. capable of providing a full rated current pulse output with a duty factor of not more than 10% are commercially available and currently exemplified by semiconductor controlled rectifiers, hard pulse modulator tubes, and other devices which will be referred to in the specification hereinafter. I have found that electrical discharge machining with high peak current pulses results in a susbtantially improved form of operation both with respect to increased metal removal rates and with respect to improved surface finish. It has further been found that, when high peak current machining pulses are applied at time-spaced intervals, and each is followed by selectively controlled and applied groups of oscillatory follow-up pulses under controlled conditions of frequency, further improvement in machining operation results. The method by which the high peak current machining pulses are generated, applied, and further used to initiate the following oscillatory pulses and the apparatus so employed form the subject matter of the present invention.

Accordingly, it is an object of this invention to provide an improved machining power supply for electrical discharge machining capable of furnishing high peak current machining pulses across the machining gap.

It is a further object of this invention to provide an improved machining power supply apparatus and method in which high peak current pulses are supplied at spaced intervals, each of which high peak current pulses initiates a train of high frequency oscillatory pulses subsequent to gap breakdown.

It is an additional object of this invention to provide an improved machining power supply apparatus in which an electronic triggering device is utilized to provide high peak current machining pulses and a gap resonant network is used to initiate intermediate trains of higher frequency oscillatory pulses.

It is a further object of this invention to provide an improved machining power supply apparatus in which a hard pulse modulator tube is operatively connected across a machining power supply and to the gap for furnishing high peak current pulses and in which at least one resonant network is connected across the gap for providing a train of follow-up oscillatory pulses subsequent to each of the high peak current pulses.

It is a still further object of this invention to provide a pulse generator adapted for employment with a load device and operable to provide thereto high peak current pulses alternated with follow-up oscillatory pulses.

The unique features, additional objects and advantages of the present invention and the manner in which these may be achieved will be more clearly understood by reference to the following detailed description of several representative embodiments of the invention when taken in connection with the accompanying drawings, in which:

FIGURE 2 is a schematic drawing substantially similar to FIGURE 1 except that the electronic triggering means is connected to the machining gap through a resonant network without employement of a gap transformer;

FIGURE 3 illustrates an alternate embodiment of the electronic triggering means utilized in FIGURES 1 and 2;

FIGURE 4 illustrates a still further embodiment of the electronic triggering means utilized in the circuit of FIGURES 1 and 2;

FIGURE 5 is a schematic drawing showing a machining power circuit in which a hard pulse modulator is utilized as the electronic switch for high frequency, high peak current operation; and FIGURES 6 and 7 are gap voltage waveform diagrams illustrating the different modes of operation of the present invention.

Figure 1:
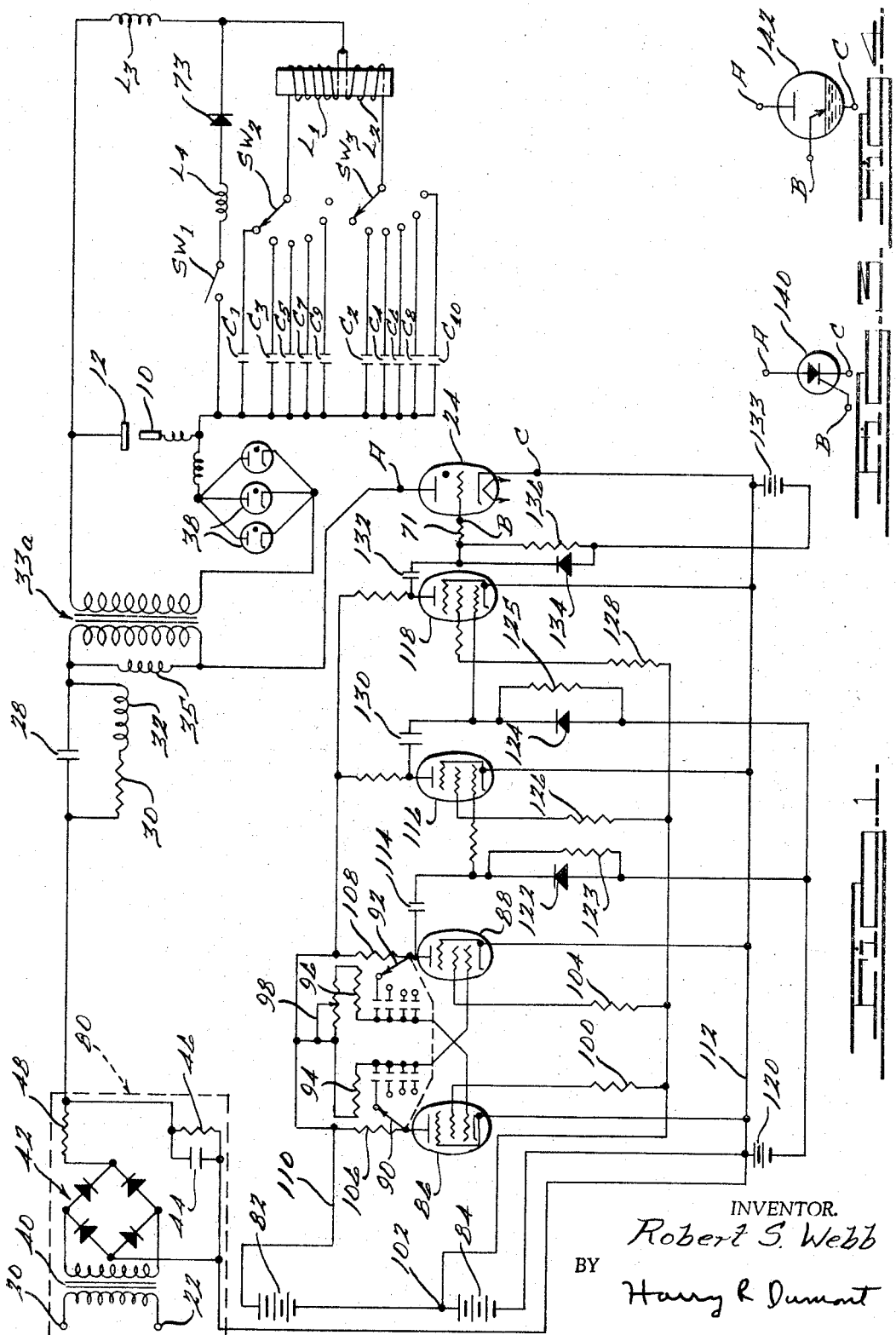
FIGURE 1 is a schematical drawing showing a high frequency operating electrical discharge machining power circuit in which a thyratron utilized as the electronic triggering means is triggered by the pulse output of an astable multivibrator.

With more particular reference to the circuit of FIGURE 1, it will be seen that the machining gap, which is normally filled with a dielectric fluid during the electrical discharge machining process, comprises an electrode 10 of negative polarity and a workpiece 12 of positive polarity. This polarity may be reversed as required for certain workpiece and electrode combinations. The circuit as illustrated in FIGURE 1 is operable to provide machining power pulses across the gap between electrode 10 and workpiece 12. A single phase A.C. line voltage across terminals 20, 22 is utilized as input. The machining power circuit includes as its major components, an electronic switch of the electronic triggering device type—thyratron 24, having its principal electrodes operatively connected across the power supply 80 and to the gap as shown. By "electronic switch" is meant any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included within this definition are vacuum tubes and transistors in which turn-on is accomplished by a control voltage applied to the control electrode and in which turn-off is accomplished automatically in response to the removal of that control voltage. Also included in the definition are devices of the gate type in which turn-on is accomplished by a control voltage applied to the control electrode which control voltage may be then removed and in which turn-off is accomplished by application of a subsequent control voltage to the control electrode. An additional class of electronic switches called electronic trigger devices falls within this definition and includes ignitrons, thyratrons, and semiconductor controlled rectifiers. By "electronic trigger device" I mean any electronic switch of the type which is triggered on at its control electrode by a pulse and is turned off by reverse voltage applied for a sufficient time across its principal electrodes. Other examples of electronic triggering devices suitable for incorporation in the circuit of FIGURE 1 will be illustrated in FIGURES 3 and 4 hereinafter. Thyratron 24 has its plate and cathode connected to terminals A and C, respectively, and its control grid connected to terminal B to receive a triggering input pulse for turn-on. The plate of thyratron 24 is connected through a transformer 33a to capacitor 28. Where transformer 33a is of the iron core type without air gap, an inductor 35 is connected in parallel to provide a series path for the overcharge of capacitor 28 to provide turn-off of thyratron 24. If transformer 33a is one wound with provision of air gap, inductor 35 may be omitted from the circuit and the inductance of the primary winding provides the series path for overcharge of capacitor 28. Capacitor 28 is provided with a series connected resistance 30 and inductor 32 connected in parallel across capacitor 28 as shown. Provision is made for furnishing machining pulses to the machining gap by connecting the secondary winding of transformer 33a connected across the machining gap comprising electrode 10 and workpiece 12 with a polarity as previously indicated. The secondary of transformer 33a further has connected in series therewith a plurality of gas filled diodes 38 to prevent the occurrence of inverse voltage across the machining gap due to flyback of the transformer 33a and, thus, to inhibit the undesirable condition of A.C. arcing. The main power supply 80 utilized comprises a transformer 40 having its primary winding connected across A.C. input terminals 20, 22 and having its secondary winding connected to bridge rectifier 42. Connected across the pulsating D.C. output of bridge rectifier 42 is a filter capacitor 44 of the electrolytic type which capacitor is paralleled by a resistor 46 and further connected in series with a surge limiting resistor 48.

The pulsing means for thyratron 24 is an electronic multivibrator. Voltage supplies 82 and 84 which may be of the order of several hundred volts are utilized to provide the necessary operating voltages for the multivibrator and successive amplifier stages which are employed. All power supplies with the exception of power supply 80 are shown in the interest of simplification as D.C. sources. In actual practice, these power supplies ordinarily employ A.C. inputs, full wave rectifiers and electrolytic storage capacitors in the manner indicated for power source 80. The multivibrator utilized comprises a pair of pentode tubes 86 and 88 having their respective control grids and plates cross-connected through a coupling network for operation in the astable mode in a manner well known in the art. The coupling network utilized includes selectively positionable ganged capacitor switches 90 and 92, resistors 94 and 96, and the variable resistance of rheostat 98. It will be seen that by the selective adjustment of the sliding contact of rheostat 98, an increase or decrease in resistance will serve to preset the multivibrator ON time. The machining gap ON time is varied directly with the setting of rheostat 98. The screen grids of tubes 86 and 88 are connected to screen voltage tap 102 through limiting resistors 100 and 104, respectively. The plates of tubes 86 and 88 are connected to the positive terminal of voltage supply 82 through load resistors 106 and 108, respectively, as connected to lead 110. The cathodes of tubes 86 and 88 are connected to the negative terminal of power supply 84 through lead 112. The output of the multiplier tube 88 is fed through coupling capacitor 114 into following amplifier stages which comprise, in the present instance, pentode tubes 116 and 118. The output signals of the several stages are clamped to negative bias voltage 120 by diodes 122 and 124 as shown. Shunt resistors 123 and 125 return the grids of tubes 116 and 118 to bias 120 in the absence of drive signal. The screen grids of tubes 116 and 118 are connected to the positive terminal of voltage supply 84 through resistors 126 and 128, respectively. The amplified signal output from tubes 116 and 118 pass through coupling capacitors 130 and 132 as indicated. Tyratron 24 has its cathode connected to the negative terminal of main power supply 80 and its plate connected through the primary winding of transformer 33a to the network comprising capacitor 28 and its parallel-connected branch including serially connected resistor 30 and inductor 32. Thyratron 24 further has its grid bias furnished by bias voltage supply 133 with diode 134 and resistors 136, 71, connected as shown. The secondary of transformer 33a is connected in series with parallel-connected diodes 38 to provide high peak current pulses across the machining gap including workpiece 12 and tool electrode 10.

A plurality of networks are selectively connectable across the gap to provide the oscillatory follow-up pulses following each of the high peak current machining pulses. Included in these networks are capacitors $C_1$–$C_{10}$ which are of differing magnitude and connectable in series with inductances $L_1$ and $L_2$ by the selective setting of switches $SW_2$ and $SW_3$. I have found that optimum machining condition exists when a particular relationship is maintained between the magnitude of the inductances and capacitances between two networks of the same resonant frequency to provide an additive voltage effect. The basic relationship to be maintained is set forth as follows:

$$L_1C_1=L_2C_2$$

$$C_1>C_2 \text{ and } L_1<L_2$$

When the respective values of capacitance and inductance are maintained as indicated above in the two complementary resonant networks, it was found that the machining rate was substantially improved.

Also conneced across the gap is a network comprising switch $SW_1$, diode 73 and inductance $L_4$. The function of this network is to cut off the negative portions of the high frequency follow-up pulses and thus maintain machining with all pulses of one polarity, as is preferable for use with certain electrode materials. The operation of the diode-inductance network will become apparent upon consideration of the waveform diagrams of FIGS. 5 and 6, hereinafter. The diode-inductance network has been found to contribute materially to the improvement of the follow-up pulses particularly when used in conjunction with a pair of resonant gap networks as above described. In any electrical discharge power supply, there is present an inherent inductance of measurable quantity in the circuit due to the lead lengths utilized in making the gap connections. This inherent inductance is indicated by the inductance $L_3$. I have found that inductance $L_4$ between the gap and a unidirectional current conducting device such as diode 73 achieves this result so long as the following relationship between the magnitudes of the inductance is maintained:

$$L_4<L_3$$

It appears that the inductance-diode network contributes to the generation of separate and distinct follow-up pulses of gradually diminishing amplitude which serves to facilitate the machining process.

FIGURE 2 is substantially similar to FIGURE 1 except that the electronic trigger device thyratron 24 is not coupled to the machining gap through a transformer but rather through the turn-off network comprising series charging inductor 37, capacitor 28, and the discharge path provided by inductor 32. The operation of the multivibrator and the additional L–C networks and diode networks connected across the gap remain the same.

FIGURE 3 shows a semiconductor controlled rectifier 140 which may be substituted for thyratron 24 in the circuits of FIGURES 1 and 2 with like connections for its principal electrodes indicated by the letters A and C and with connection for its control electrode or gate at B. Like the thyratron of circuits 1 and 2, controlled rectifier 140 has the basic function of an "electronic trigger device" and remains in a non-conducting or "off" state until turned on or triggered by a control signal of the proper polarity. The controlled rectifier 140 thus remains ON until turned OFF as is ordinarily accomplished by lowering its anode voltage below the dropout level. It will be seen that incorporation of the controlled rectifier in the circuits of FIGURES 1 and 2 may be readily accomplished by suitable adjustment of operating voltages and circuit parameters in a manner readily known to one skilled in the art. It has been found that in operation of the circuit, use of controlled rectifiers is of particular advantage where high peak currents are required for short duration, low duty cycle pulses. A controlled rectifier further has a forward voltage drop many times lower than that of a thyratron resulting in significantly higher operating efficiency.

In FIGURE 4 is shown an ignitron 142 adapted to be connected to the circuit of FIGURES 1 and 2 with terminal connections as shown to provide an alternate species of the present invention with the ignitron furnishing still another example of an "electronic trigger device" as previously defined. While the operating characteristics of ignitrons and thyratrons are similar in many respects, the ignitron is essentially a large current, low voltage device. The ignitron offers some advantages over the thyratron in that it particularly lends itself to the high peak current and high power requirements of an EDM power supply. Additionally, the ignitron has the advantage of exceptional sturdiness and the ability to withstand temporary short circuit conditions which might be damaging to a thyratron.

FIGURE 5 illustrates an alternate embodiment of the present invention. It will be observed that there is a basic similarity between this circuit and the circuit of FIGURE 1. Both circuits utilize an astable multivibrator incorporating tubes 86, 88 to provide high frequency operation of the eelctronic switch used. The mode of operation of the multivibrator permits maintenance of a constant frequency of operation according to the setting of capacitor switches 90, 92 with the machining gap ON–OFF time or duty factor being variable according to the setting of potentiometer 98. Both circuits utilize the same resonant networks and switching arrangements across the machining gap to provide the oscillatory or unidirectional follow-up pulses required. Both circuits additionally serve to provide a source of high peak current machining pulses across the gap. Whereas the previously described circuits provided the high peak current pulses by use of an electronic trigger device and its turn-off network, the circuit of FIGURE 5 achieves this provision through employment of a hard pulse modulator tube such as triode tube 143. It will be appreciated that in accordance with the power requirements of the particular EDM application, several hard pulse modulator tubes may be connected in a bank for parallel operation. Hard pulse modulator tubes have come into wide acceptance in the electronics art for pulse modulator service. Hard pulse modulator tubes of the oxide-cathode, shielded grid type with appropriate high peak current characteristics are particularly suitable for electrical discharge machining. Such tubes are currently commercially available from the Machlett Laboratories, Inc. of Springdale, Connecticut and from other sources. The circuit of FIGURE 5 is operable at substantially higher frequencies than the circuits we have previously considered. A damping diode 148 and a thyrite cell 146 are connected serially as shown across the primary of transformer 33. In the FIGURE 5 circuit, the transformer 33 is preferably of the thin lamination or ferrite type with C core and no appreciable air gap provided. To insure the turn ON of tube 143, a drive pulse with a relatively longer ON time is required from multivibrator 86, 88 than was previously needed to trigger the electronic trigger devices previously shown and discussed in connection with FIGURES 1–4.

*Description of operation*

The description of operation will now be made with particular reference to the gap voltage waveforms as shown in FIGURES 6 and 7. FIGURE 6 illustrates the operation of a circuit such as FIGURES 1, 2 and 5 in which the main machining pulses are initiated by the action of an electronic switching means, more particularly, an electronic triggering means such as thyratron 24 or hard pulse modulator tube 143. It will be seen that the resultant power pulse provided to the gap is of relatively high peak current. As thyratron 24 is rendered conductive, the capacitors $C_1$–$C_{10}$ which may be selectively connected across the gap are charged rapidly along curve 202 to the maximum point where gap breakdown occurs at point 204. The first forward gap discharge 206 occurs during the initial discharge of the capacitors. The first reverse gap discharge 208 occurs due to the overdischarge of the capacitors. As the capacitors discharge along damped waveform 210, subsequent arcs 212 and 214 are formed across the gap. At a point 216, the voltage is insufficient to cause arc conduction and no further conduction occurs until the next pulse from thyratron 24 charges the capacitors along line 218 causing a similar damped wave 220 and corresponding follow-up discharges. This charge 218 is shown arbitrarily as breaking down at a lower level than point 204 of discharge 202 and accordingly, the damped train of follow-up pulses is of lower magnitude and of shorter duration resulting in a longer off-time until the next high peak current pulse 222 occurs. One important advantage of this type of operation is that no charging current flows from the main power source 80 except during the initial period. The repetition rate 224 can therefore be determined by maximum permissible gap conditions without occurrence of continuous arcing as at point 216.

FIGURE 7 illustrates the mode of operation of the circuits of FIGURES 1, 2 and 5 in which there has been a closure of switch $SW_1$ to connect diode 73 and its associated inductance network across the gap. It will be seen that the effect of this closure is to limit the reverse voltage across the gap to a magnitude such as that shown by waveform 226. The current through diode 73 is highest on the first reverse discharge and, therefore, the conduction drop across the diode is highest at this time. The maximum conduction drop is substantially less than the level required to cause arc conduction on reverse cycles such as is exemplified by points 208 or 214 of FIGURE 6.

It will be seen from the foregoing specification and drawings that the electrical discharge machining power supply disclosed represents a substantial advance in the art. While the invention has been described as incorporated in a machining power circuit for electrical discharge machining, it is not limited to that environment but may be used in any pulse generator in which a precisely generated pulse train of the type described is furnished to a load device.

I claim:

1. In an apparatus for machining a conductive workpiece by intermittent electrical discharge across a dielectric coolant filled gap between a tool electrode and the workpiece, a machining power circuit for supplying machining power pulses to the gap comprising a power supply, an electronic trigger device having its principal electrodes connected between said power supply and said gap, a capacitor connected in series with one of said principal electrodes, an inductor connected in series with said capacitor for overcharging it and a shunt discharge path connected across said capacitor, a triggering means operatively connected to the control electrode of said trigger device for rendering it periodically conductive, and a network connected across the gap for impressing across the gap a plurality of oscillatory pulses of higher frequency than said machining pulses and of amplitude and time duration sufficient to provide gap breakdown, said network comprising an inductor $L_1$ and a capacitor $C_1$ serially connected across said gap, a second inductor $L_2$ and a capacitor $C_2$ serially connected across said gap wherein the magnitude of the aforesaid inductors and capacitors have the following relationships:

$$L_1C_1=L_2C_2,\ C_1>C_2 \text{ and } L_1<L_2$$

2. The combination as set forth in claim 1 in which said electronic trigger device comprises a semiconductor controlled rectifier having its cathode and anode connected between said power supply and said capacitor and having its gate connected to said triggering means.

3. In an electrical discharge machining apparatus for machining a conductive workpiece by a tool electrode across a dielectric coolant filled gap, a power supply circuit comprising a source of machining power pulses operatively connected to said gap for furnishing time-spaced machining power pulses thereto and a network connected across said gap for impressing thereacross after each of said machining power pulses a plurality of oscillatory pulses of higher frequency than said machining pulses and of amplitude and time duration sufficient to provide gap breakdown, said network comprising a first resonant network including an inductor $L_1$ and a capacitor $C_1$ connected in series across said gap, a second resonant network including an inductor $L_2$ and a capacitor $C_2$ connected in series across said gap, wherein the magnitude of the aforesaid inductors and capacitors have the following relationships: $L_1C_1=L_2C_2$, $C_1>C_2$ and $L_1<L_2$.

References Cited
UNITED STATES PATENTS

| | | | |
|---|---|---|---|
| 2,550,488 | 4/1951 | Marsh | 177—311 |
| 2,866,921 | 12/1958 | Matulaitis et al. | 315—127 |
| 3,054,931 | 9/1962 | Inoue | 315—205 |
| 3,087,044 | 4/1963 | Inoue | 219—69 |
| 3,213,319 | 10/1965 | Inoue | 315—170 |
| 3,229,159 | 1/1966 | Webb | 315—171 |
| 3,246,113 | 4/1966 | Scarpelli | 219—69 |

JOHN W. HUCKERT, *Primary Examiner.*

R. F. SANDLER, *Assistant Examiner.*